US008792101B2

(12) United States Patent
Nozawa

(10) Patent No.: US 8,792,101 B2
(45) Date of Patent: Jul. 29, 2014

(54) OPTICAL MODULE AND SPECTROSCOPIC ANALYZER

(75) Inventor: Takeshi Nozawa, Suwa (JP)

(73) Assignee: Seiko Epson Corporation (JP)

( * ) Notice: Subject to any disclaimer, the term of this patent is extended or adjusted under 35 U.S.C. 154(b) by 185 days.

(21) Appl. No.: 13/357,749

(22) Filed: Jan. 25, 2012

(65) Prior Publication Data

US 2012/0194821 A1 Aug. 2, 2012

(30) Foreign Application Priority Data

Jan. 27, 2011 (JP) ................................. 2011-015698

(51) Int. Cl.
G01B 9/02 (2006.01)
G01J 3/45 (2006.01)

(52) U.S. Cl.
USPC .......................................... 356/454; 359/577

(58) Field of Classification Search
USPC .................. 356/454, 519; 359/260, 577–579
See application file for complete search history.

(56) References Cited

U.S. PATENT DOCUMENTS 6,351,577 B1 2/2002 Aksyuk et al.
7,286,244 B2 10/2007 Murata
7,795,586 B2 9/2010 Krummel et al.
8,194,252 B2 * 6/2012 Yasuda .......................... 356/454
2005/0134962 A1 * 6/2005 Verghese ....................... 359/579

FOREIGN PATENT DOCUMENTS

| JP | 57106842 A | * | 7/1982 |
| JP | 09-258116 | | 10/1997 |
| JP | 11-142752 | | 5/1999 |
| JP | 2003014646 A | * | 1/2003 |
| JP | 2004-287215 | | 10/2004 |
| JP | 2005-106753 | | 4/2005 |
| JP | 2005-539229 | | 12/2005 |
| JP | 2008-116669 A | | 5/2008 |
| JP | 2008-224792 A | | 9/2008 |
| WO | WO 2008047773 A1 | * | 4/2008 |

* cited by examiner

Primary Examiner — Michael A Lyons
(74) Attorney, Agent, or Firm — Harness, Dickey & Pierce, P.L.C.

(57) ABSTRACT

A colorimetric sensor includes an etalon including a first substrate, a second substrate facing the first substrate, a fixed mirror formed on a surface of the first substrate facing the second substrate, and a movable mirror formed on the second substrate so as to face the fixed mirror with a prescribed gap therebetween, a light receiving element that receives a test subject light having passed through the etalon, and a holding member holding the etalon. The etalon includes a light interference area facing the first and second substrates in a plan view as seen in a thickness direction of the substrate, and a protruding area protruding from the light interference area. The holding member holds the etalon at one end side of the protruding area opposite to the light interference area.

8 Claims, 13 Drawing Sheets

OPTICAL MODULE AND SPECTROSCOPIC ANALYZER

BACKGROUND

1. Technical Field

The present invention relates to an optical module including an interference filter that extracts light of a prescribed wavelength from an incident light and a spectroscopic analyzer including the optical module.

2. Related Art

In the related art, an interference filter (etalon) in which multi-layer films (reflecting films) are disposed on the facing surfaces of a pair of substrates so as to face each other with a prescribed gap therebetween is known (for example, see JP-A-11-142752).

In the interference filter disclosed in JP-A-11-142752, driving electrodes are disposed on the facing surfaces of the pair of reflecting films so as to face each other in order to adjust the gap, and the gap can be adjusted by an electrostatic attractive force by applying a driving voltage to the respective driving electrodes. In this way, the interference filter can pass only light of a specific wavelength corresponding to the gap. That is, the interference filter causes the incident light to experience multiple interference between the pair of reflecting films and passes only light of the specific wavelength which is strengthened by the multiple interference.

However, the above-described interference filter is generally used by being incorporated into an optical module or a spectroscopic analyzer. FIG. 13 is a schematic view showing a simplified configuration of a colorimetric device 10 (spectroscopic analyzer) of the related art including an etalon 50.

The colorimetric device 10 includes a light source device 20 that emits light to a test subject A, the etalon 50 that disperses a test subject light reflected by the test subject A, a light receiving element 420 that receives light having passed through the etalon 50, and a colorimetric sensor 40 (optical module) including an outer housing 40A in which a printed substrate 410 connected to the light source device 20 and the light receiving element 420 is accommodated.

The colorimetric sensor 40 includes a cylindrical holding housing 310 that is provided adjacent to the light source device 20 so as to hold the outer circumference of the etalon 50.

Moreover, in the colorimetric device 10, light emitted from the light source device 20 is reflected by the test subject A, and the reflected test subject light is dispersed by the colorimetric sensor 40. Based on a detection signal output from the colorimetric sensor 40, the chromaticity of the test subject light, namely the color of the test subject A is analyzed and measured from the intensities of light of the dispersed respective wavelengths.

However, in the configuration of the related art shown in FIG. 13, the holding housing 310 holds the outer circumference adjacent to a portion of the etalon 50 in which the reflecting film is formed. In such a configuration, heat generated by the light source device 20 may be transmitted directly to the etalon 50 from the holding housing 310. Thus, the substrate may be deformed by thermal expansion.

In addition, since the outer circumference of the etalon 50 adjacent to the reflecting film is held by the holding housing 310, the substrate may be deformed by the holding force of the holding housing 310.

As above, when the reflecting film is deformed, there is a problem in that the transmission wavelength of light passing through the etalon 50 may fluctuate, and the resolution may decrease.

SUMMARY

An advantage of some aspects of the invention is that it provides an optical module and a spectroscopic analyzer capable of suppressing a decrease in the resolution of an interference filter.

An aspect of the invention is directed to an optical module including: an interference filter including a first substrate, a second substrate facing the first substrate, a first reflecting film formed on a surface of the first substrate facing the second substrate, and a second reflecting film formed on the second substrate so as to face the first reflecting film with a prescribed gap therebetween; and a holding member that holds the interference filter, wherein the interference filter includes a light interference area in which the first and second reflecting films are formed in a plan view as seen in a thickness direction of the substrate, and a protruding area protruding in a direction away from the light interference area, and wherein the holding member holds the interference filter at one end side of the protruding area opposite to the light interference area.

According to the above aspect of the invention, the interference filter includes the light interference area facing the first and second substrates and the protruding area protruding from the light interference area. Moreover, the holding member holds the distal end side (a side opposite to the light interference area) of the protruding area to thereby hold the interference filter. Thus, since the interference filter is held by the holding member at a position away from the reflecting film, the reflecting film formed on the light interference area is not deformed by the holding force of the holding member. Moreover, for example, even when the holding member is heated by a light source device or the like, transmission of heat is suppressed by the protruding area. Therefore, it is possible to suppress heating of the light interference area and to suppress deformation of the substrate and the reflecting film due to heating. Accordingly, since deformation of the reflecting film can be prevented, it is possible to maintain the parallel state between the reflecting films of the interference filter and to suppress a decrease in the resolution.

In the optical module of the above aspect of the invention, it is preferable that the first and second substrates have the same shape, the interference filter includes a supporting substrate which is bonded to either the first substrate or the second substrate, and the protruding area is formed on the supporting substrate.

According to the above configuration, the interference filter includes the supporting substrate including the protruding area in addition to the first and second substrates forming the reflecting film. Moreover, since the holding member holds the protruding area of the supporting substrate, the first and second substrates for holding the interference filter are held without being deformed. Moreover, for example, even when heat is transmitted to the holding member, it is possible to suppress heat from being transmitted to the protruding area. Furthermore, since the first and second substrates in which the light interference area is formed are provided to be separate from the supporting member, it is possible to suppress transmission of heat more reliably.

In the optical module of the above aspect of the invention, the protruding area may be formed on at least one of the first substrate and the second substrate.

In the above configuration, the protruding area is formed in at least one of the first and second substrates. In such a configuration, since it is not necessary to provide a supporting substrate which is a separate member for forming the protruding area, it is possible to further simplify the configuration.

In the optical module according to the above aspect of the invention, it is preferable that a vibration absorbing portion that absorbs vibration is formed in the protruding area.

Here, as the vibration absorbing portion, for example, a portion having a smaller width or thickness dimension than the other portions may be formed in a part of the protruding area so that a structurally weaker portion than the other portions is formed.

According to the above configuration, since the vibration absorbing portion is formed in the protruding area, when vibration is applied from the outside, the vibration is absorbed by the vibration absorbing portion. Thus, it is possible to suppress the vibration from being transmitted to the light interference area of the interference filter. Therefore, it is possible to prevent a change in the gap between the reflecting films of the interference filter due to vibration applied from the outside.

Another aspect of the invention is directed to a spectroscopic analyzer including the optical module according to the above aspect, in which the optical module includes a light receiving unit that receives a test subject light extracted by the interference filter, and the spectroscopic analyzer further includes an analysis processing unit that analyzes optical properties of the test subject light based on the intensity of the test subject light received by the light receiving unit.

According to the above aspect, since the spectroscopic analyzer includes the optical module of the above aspect, it is possible to suppress a decrease in the resolution. Thus, the light receiving unit can measure the light intensity with high accuracy. Moreover, by performing spectroscopic analysis based on the measurement results, it is possible to obtain accurate spectroscopic properties.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be described with reference to the drawings.

1. Simplified Configuration of Colorimetric Device

Figure 1:
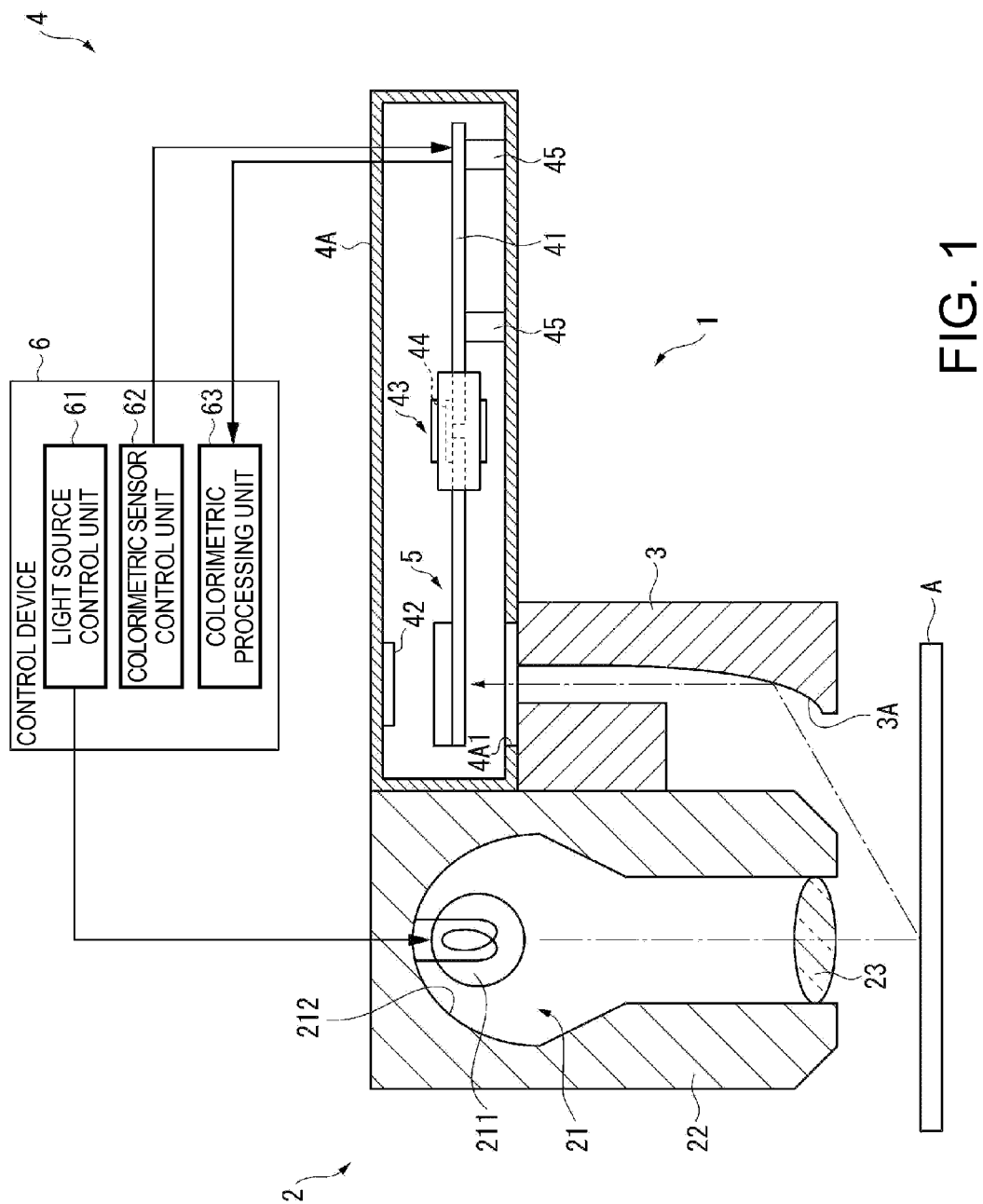
FIG. 1 is a schematic view showing a simplified configuration of a colorimetric device according to a first embodiment of the invention.

FIG. 1 is a schematic view showing a simplified configuration of a colorimetric device 1 (spectroscopic analyzer) according to a first embodiment of the invention.

As shown in FIG. 1, the colorimetric device 1 includes a light source device 2 that emits light to a test subject A, a concave lens 3 that guides a reflection light (test subject light) reflected by the test subject A to a colorimetric sensor 4 described later, a colorimetric sensor 4 (optical module) having an etalon 5 (interference filter), and a control device 6 that controls an overall operation of the colorimetric device 1. Moreover, the colorimetric device 1 is a device in which light emitted from the light source device 2 is reflected by the test subject A, the reflected test subject light is received by the colorimetric sensor 4, and the chromaticity of the test subject light, namely the color of the test subject A is analyzed and measured based on the detection signal output from the colorimetric sensor 4.

2. Configuration of Light Source Device

As shown in FIG. 1, the light source device 2 includes a light source unit 21, a storage housing 22, and a lens 23, which are integrated with each other.

The light source unit 21 includes a white light source 211 that is connected to the control device 6 so as to emit white light to the test subject A and a reflection mirror 212 that reflects light emitted from the white light source 211.

The storage housing 22 is formed in a cylindrical shape using a quartz glass, an acrylic resin, or the like, and causes the light reflected by the reflection mirror 212 to undergo multiple reflection therein to thereby cause the light emitted from the white light source 211 to be emitted to the lens 23.

The lens 23 collimates the light having undergone multiple reflection in the storage housing 22 and causes the collimated light to enter the test subject A.

In the present embodiment, although the colorimetric device 1 having the light source device 2 is illustrated, when the test subject A is a light emitting member such as a liquid crystal panel, for example, the light source device 2 may not be provided in the colorimetric device 1.

3. Configuration of Concave Lens

As shown in FIG. 1, the concave lens 3 is fixed to the outer side surface of the light source device 2. The concave lens 3 includes a concave mirror 3A that reflects the test subject light reflected by the test subject A in a prescribed direction so as to be focused on the etalon 5.

4. Configuration of Colorimetric Sensor

Figure 2:
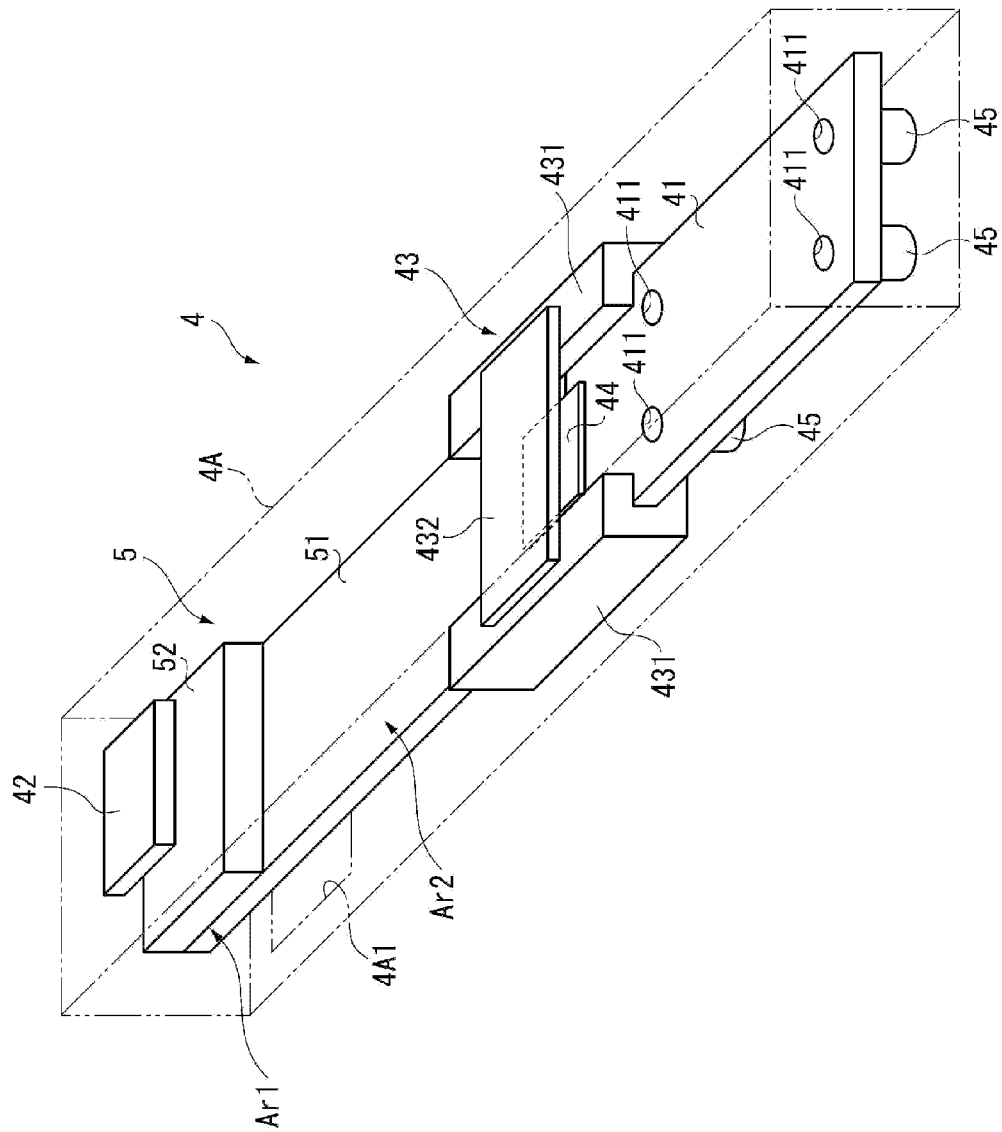
FIG. 2 is a perspective view showing a colorimetric sensor according to the first embodiment.

FIG. 2 is a perspective view showing the colorimetric sensor 4.

As shown in FIG. 2, the colorimetric sensor 4 includes a rectangular parallelepiped outer housing 4A, and the outer housing 4A is fixed to the outer side surface of the light source device 2 and is also fixed to the upper surface of the concave lens 3 as shown in FIG. 1. Moreover, an opening 4A1 through which the test subject light enters is formed on the lower surface (a surface fixed to the upper surface of the concave lens 3) of the outer housing 4A.

The colorimetric sensor 4 includes the etalon 5, a printed substrate 41 connected to the control device 6, a light receiving element 42 (light receiving unit) that receives light having passed through the etalon 5, and a holding member 43 that holds the etalon 5. These respective constituent members 5 and 41 to 43 are accommodated in the outer housing 4A.

Moreover, in the colorimetric sensor 4, light of a prescribed wavelength within the test subject light entering through the opening 4A1 is dispersed by the etalon 5, and the dispersed light is received by the light receiving element 42.

4-1. Configuration of Printed Substrate

The printed substrate 41 has one end connected to a first substrate 51 (described later) of the etalon 5 through an FPC (Flexible Printed Circuit) 44 which is connected through an ACF (Anisotropic Conductive Film) connection, and the other end connected to the control device 6 through a wiring not shown. Moreover, the printed substrate 41 is mounted in the outer housing 4A through four spacers 45, for example.

As shown in FIG. 2, the spacers 45 are inserted through four insertion holes 411 which are formed near the corners of the printed substrate 41. The spacers 45 are fastened to the bottom surface of the outer housing 4A, whereby the printed substrate 41 is fixed to the inner surface of the outer housing 4A.

4-2. Configuration of Light Receiving Element

The light receiving element 42 includes a plurality of photoelectric conversion elements and generates an electrical signal corresponding to the amount of received light. Moreover, the light receiving element 42 is disposed at a position facing a second substrate 52 (described later) of the etalon 5 and is connected to the control device 6 by being connected to the printed substrate 41 through a wiring not shown. In this way, the light receiving element 42 outputs the generated electrical signal to the control device 6 as a reception light signal.

4-3. Configuration of Holding Member

Figure 3:
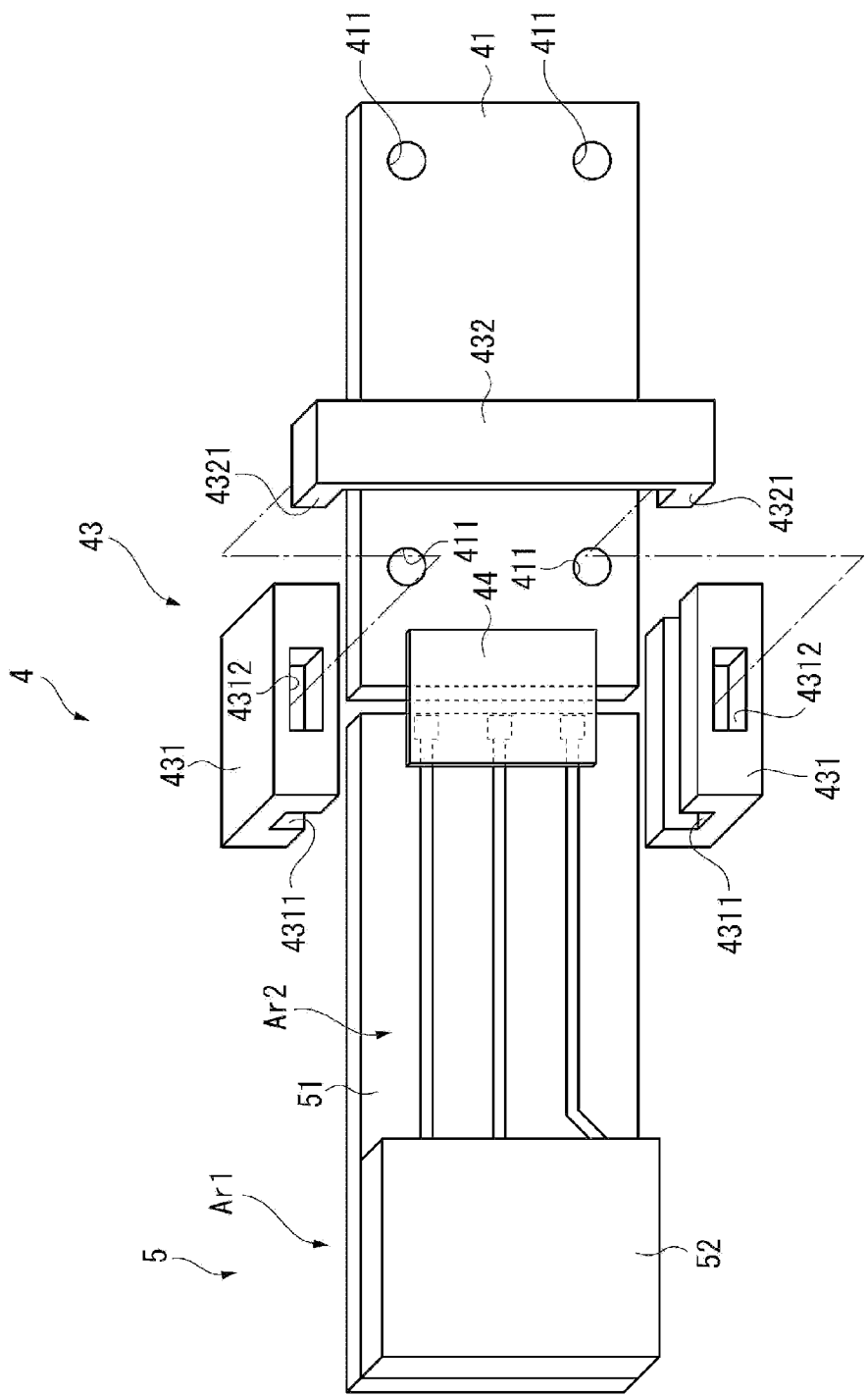
FIG. 3 is an exploded perspective view of the colorimetric sensor according to the first embodiment.

FIG. 3 is an exploded perspective view of the colorimetric sensor 4 in which the holding member 43 is exploded. In FIG. 3, the outer housing 4A is not illustrated for the sake of convenience.

The holding member 43 holds a distal end side (a side of a protruding area Ar2 (described later) opposite a light interference area Ar1) of the first substrate 51 of the etalon 5 to thereby hold the etalon 5. As shown in FIGS. 2 and 3, the holding member 43 includes a pair of grasping portions 431 that grasp the first substrate 51 (described later) of the etalon 5 and the printed substrate 41 and a fixing portion 432 that fixes the respective grasping portions 431.

The grasping portion 431 includes an engagement groove 4311 that engages with the first substrate 51 and the printed substrate 41 and a rectangular engagement hole 4312 that engages with the fixing portion 432.

The fixing portion 432 is formed in a C-shape and includes a pair of engagement portions 4321 that engages with each of the engagement holes 4312 of the grasping portions 431.

In the holding member 43, one set of ends of the first substrate 51 and the printed substrate 41 engage with the engagement grooves 4311 of the pair of grasping portions 431, whereby the first substrate 51 and the printed substrate 41 are grasped. Moreover, the engagement portions 4321 of the fixing portion 432 engage with the engagement holes 4312 of the grasping portions 431, whereby the grasping portions 431 are fixed by the fixing portion 432. In this way, the holding member 43 holds the printed substrate 41 and the etalon 5.

4-4. Configuration of Etalon

Figure 4:
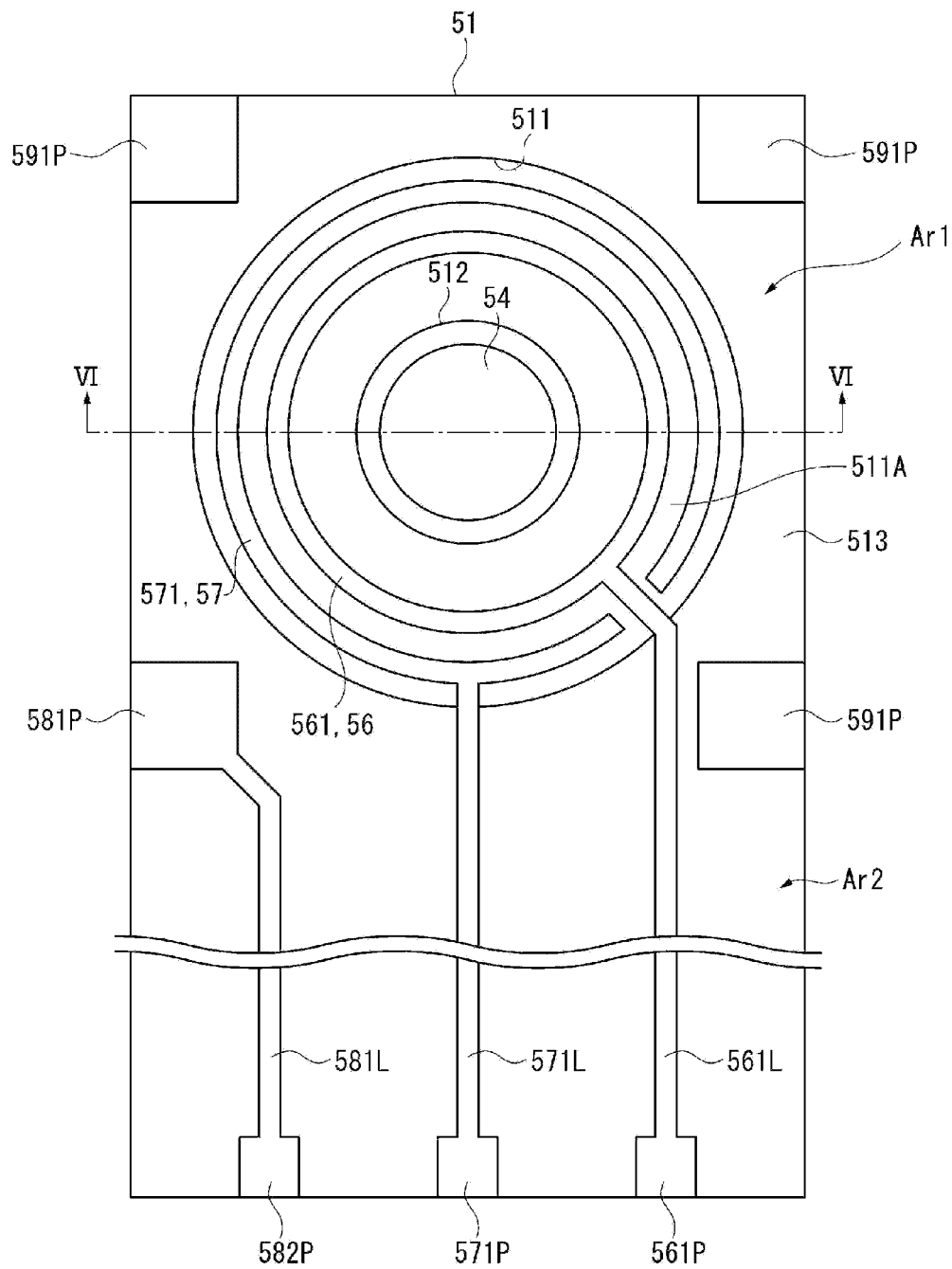
FIG. 4 is a plan view of a first substrate of an etalon according to the first embodiment.
Figure 5:
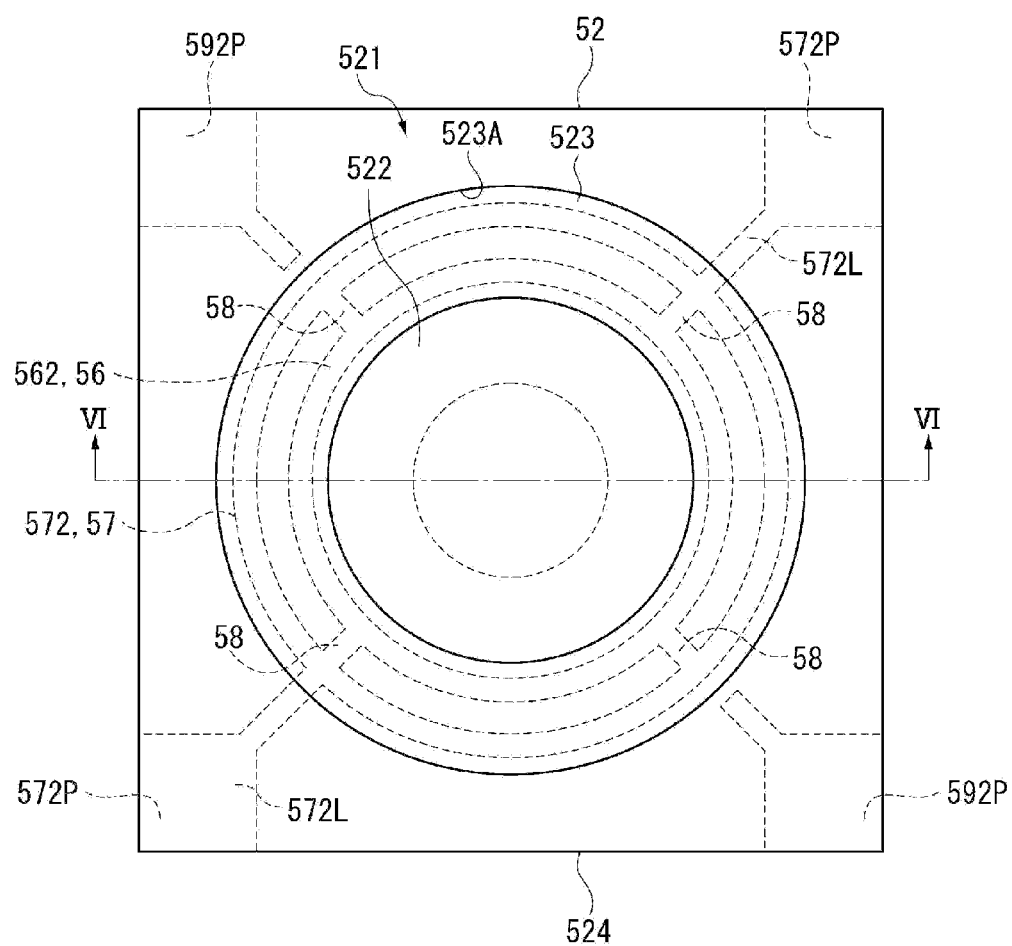
FIG. 5 is a plan view of a second substrate of the etalon according to the first embodiment.
Figure 6:
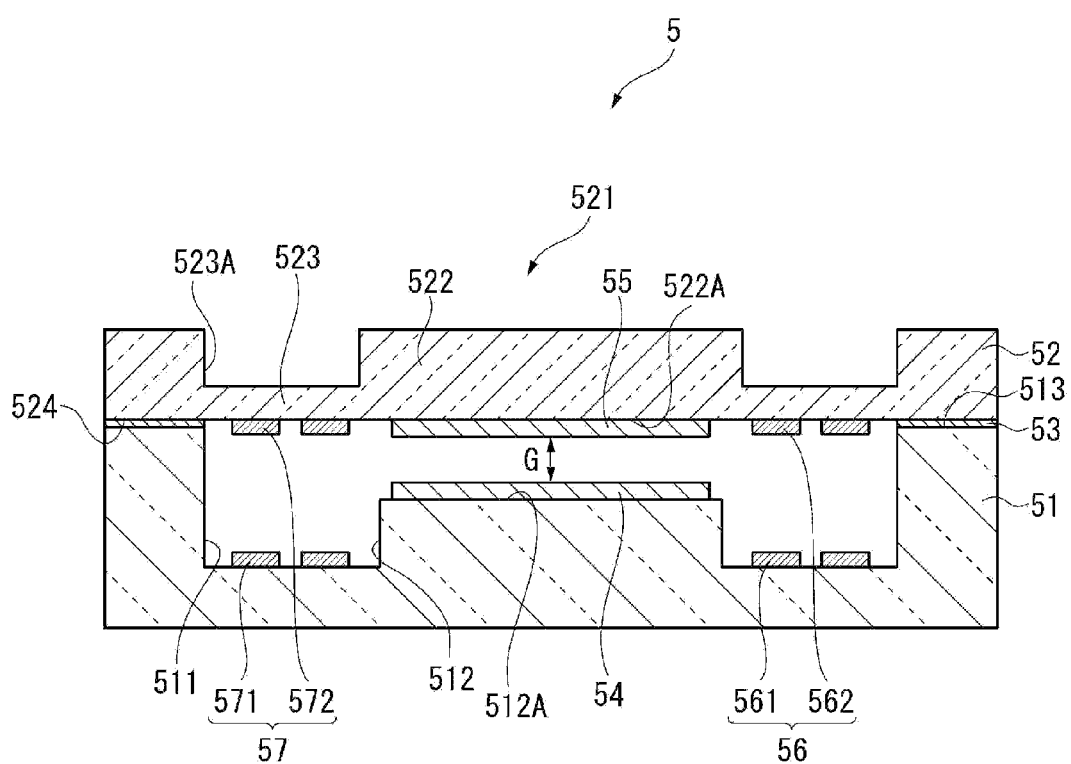
FIG. 6 is a simplified cross-sectional view of the etalon according to the first embodiment.

FIG. 4 is a plan view of the first substrate 51 of the etalon 5, and FIG. 5 is a plan view of the second substrate 52 of the etalon 5. FIG. 6 is a simplified cross-sectional view of the etalon 5 taken along the arrows VI-VI in FIGS. 4 and 5.

As shown in FIG. 6, the etalon 5 includes the first and second substrates 51 and 52, and these substrates 51 and 52 are integrated with each other by being bonded to each other with a bonding layer 53 disposed therebetween by siloxane bonding or the like using a plasma polymerized film. These two substrates 51 and 52 are each formed, for example, of various kinds of glass such as soda glass, crystalline glass, quartz glass, lead glass, potassium glass, borosilicate glass, or alkali-free glass, crystal, and the like.

As shown in FIG. 4, the first substrate 51 is a planar optical member having a rectangular shape in plan view and has dimensions such that the short side thereof is 10 mm long, for example, and the long side thereof is 50 mm long, for example.

As shown in FIG. 5, the second substrate 52 is a planar optical member having a square shape in plan view and has dimensions such that one side thereof is 10 mm long, for example.

As shown in FIG. 6, a fixed mirror 54 (first reflecting film) and a movable mirror 55 (second reflecting film) are provided between the first and second substrates 51 and 52. Here, the fixed mirror 54 is formed on a surface of the first substrate 51 facing the second substrate 52, and the movable mirror 55 is formed on a surface of the second substrate 52 facing the first substrate 51. Moreover, the fixed mirror 54 and the movable mirror 55 are disposed so as to face each other with an inter-mirror gap G disposed therebetween.

Furthermore, a first electrostatic actuator 56 and a second electrostatic actuator 57 for adjusting the dimension of the inter-mirror gap G between the respective mirrors 54 and 55 are provided between the first and second substrates 51 and 52.

In the present embodiment, although the first and second electrostatic actuators 56 and 57 are provided, only one electrostatic actuator may be formed, and three or more electrostatic actuators may be formed. In addition, a driving unit for changing the gap between the mirrors 54 and 55 is not limited to the electrostatic actuator, but an optional configuration such as a piezoelectric actuator, an air pressure actuator, or the like may be used.

4-4-1. Configuration of First Substrate

The first substrate 51 is formed by processing a glass substrate which is 500 μm thick, for example, by etching. As shown in FIG. 4, the first substrate 51 includes the light interference area Ar1 facing the second substrate 52 and the protruding area Ar2 protruding from the light interference area Ar1 in the longitudinal direction.

As shown in FIGS. 4 and 6, an electrode forming groove 511 and a mirror fixing portion 512 are formed in the light interference area Ar1 of the first substrate 51 by etching.

A ring-shaped electrode fixing surface 511A is formed on a portion of the electrode forming groove 511 extending from the outer circumference of the mirror fixing portion 512 to the inner circumferential wall of the electrode forming groove 511. A ring-shaped inner first electrode 561 and a C-shaped outer first electrode 571 on the outer side of the inner first electrode 561 are formed on the electrode fixing surface 511A.

The respective first electrodes 561 and 571 are not particularly limited as long as they have conductive properties and are capable of generating an electrostatic attractive force between the respective first electrodes 561 and 571 and respective second electrodes 562 and 572 (described later) of the second substrate 52 when a voltage is applied between the respective second electrodes 562 and 572. For example, in the present embodiment, although an ITO (Indium Tin Oxide) is used, a metal laminate such as an Au—Cr laminate may be used. Moreover, although not shown in the drawing, an insulating film is formed on the upper surfaces of the respective first electrodes 561 and 571 in order to prevent leakage due to discharge between the respective first electrodes 561 and 571 and the respective second electrodes 562 and 572. As the insulating film, $SiO_2$, TEOS (Tetra Ethoxy Silane), or the like can be used, and in particular, $SiO_2$ having the same optical properties as a glass substrate that forms the first substrate 51 is preferred. When $SiO_2$ is used as the insulating film, reflection or the like of light does not occur between the first substrate 51 and the insulating film. Thus, it is possible to form the insulating film on the entire surface of the first substrate 51 facing the second substrate 52 after forming the respective first electrodes 561 and 571 on the first substrate 51.

As shown in FIG. 4, the mirror fixing portion 512 is formed in an approximately cylindrical shape having a smaller diameter than the electrode forming groove 511 on the same axis as the electrode forming groove 511. The mirror fixing portion 512 includes a mirror fixing surface 512A on a surface facing the second substrate 52.

Moreover, a fixed mirror 54 which has a diameter of about 3 mm and is formed of a circular $TiO_2$—$SiO_2$ based dielectric multi-layer film is fixed to the mirror fixing surface 512A. In the present embodiment, although a $TiO_2$—$SiO_2$ based dielectric multi-layer film mirror is used as the fixed mirror 54, an Ag alloy single-layer mirror capable of covering the entire visible light range as a resolvable wavelength range may be used.

From a part of the outer circumference of the inner first electrode 561, one inner first electrode line 561L is formed so as to extend up to one end of the first substrate 51 toward the protruding area Ar2 in the plan view shown in FIG. 4. An inner first electrode pad 561P is formed at the distal end of the inner first electrode line 561L.

Moreover, from a part of the outer circumference of the outer first electrode 571, one outer first electrode line 571L is formed so as to extend up to one end of the first substrate 51 toward the protruding area Ar2 in the plan view shown in FIG. 4. An outer first electrode pad 571P is formed at the distal end of the outer first electrode line 571L.

Moreover, in the plan view shown in FIG. 4, among the four corners of the light interference area Ar1, a first conductive electrode pad 581P which is conductive to a second electrode pad 572P (described later) is formed at the bottom left corner, and three first facing electrode pads 591P which are not conductive to the respective first electrodes 561 and 571 and the respective second electrodes 562 and 572 are formed at the top left, top right, and bottom right corners.

The first facing electrode pads 591P have the same configuration as the first electrode pad 571P. Thus, by forming the three first facing electrode pads 591P and one first conductive electrode pad 581P at the four corners of the light interference area Ar1 of the first substrate 51, deformation of the light interference area Ar1 of the first substrate 51 due to film stress occurring when forming the respective first electrodes 561 and 571 can be better prevented than when the respective electrode pads 581P and 591P are not formed at the four corners. Therefore, it is possible to prevent the mirror fixing surface 512A (see FIG. 6) from being tilted.

From the first conductive electrode pad 581P, one conductive electrode line 581L is formed so as to extend up to one end of the first substrate 51 toward the protruding area Ar2 in the plan view of the etalon shown in FIG. 4. A second conductive electrode pad 582P is formed at the distal end of the conductive electrode line 581L.

The respective first electrode pads 561P and 571P and the second conductive electrode pad 582P are connected to the printed substrate 41 through the FPC 44 (see FIG. 1). In this way, a voltage based on the control signal input from the control device 6 is applied to the respective first electrode pads 561P and 571P and the second conductive electrode pad 582P.

Here, a portion of the light interference area Ar1 of the first substrate 51, on which the electrode forming groove 511 and the mirror fixing portion 512 are not formed corresponds to a bonding surface 513 of the first substrate 51. As shown in FIG. 6, a bonding layer 53 is formed on the bonding surface 513. A plasma-polymerized film or the like containing polyorganosiloxane as its main material can be used as the bonding layer 53.

4-4-2. Configuration of Second Substrate

The second substrate 52 is formed by processing a glass substrate which is 200 μm thick, for example, by etching. As shown in FIGS. 4 to 6, the second substrate 52 faces the light interference area Ar1 of the first substrate 51.

A displacement portion 521 having a circular shape about the substrate center in plan view, for example, is formed in the second substrate 52. As shown in FIGS. 5 and 6, the displacement portion 521 is on the same axis as a cylindrical movable portion 522 that moves toward and away from the first substrate 51. The displacement portion 521 includes a connection holding portion 523 that is formed in a ring shape in the plan view of the etalon, and holds the movable portion 522 so as to be movable in the thickness direction of the second substrate 52.

The displacement portion 521 is formed by forming a groove on a flat plate-shaped glass substrate which is the formation material of the second substrate 52 by etching. That is, the displacement portion 521 is formed by performing etching to form a ring-shaped circular groove portion 523A for forming the connection holding portion 523 on an incidence-side surface of the second substrate 52 which does not face the first substrate 51.

The movable portion 522 has a larger thickness dimension than the connection holding portion 523, and for example, in the present embodiment, the movable portion 522 has a thickness of 200 μm which is the same as the thickness dimension of the second substrate 52. The diameter dimension of the movable portion 522 is larger than the diameter dimension of the mirror fixing portion 512 of the first substrate 51.

A movable surface 522A that is parallel to the mirror fixing surface 512A of the first substrate 51 is formed on a surface of the movable portion 522 facing the first substrate 51, and a movable mirror 55 having the same configuration as the fixed mirror 54 is formed on the movable surface 522A.

The connection holding portion 523 is a diaphragm surrounding the periphery of the movable portion 522 and has a thickness dimension of 50 μm, for example. An inner second electrode 562 and an outer second electrode 572 which are formed in a ring shape are formed on a surface of the connection holding portion 523 facing the first substrate 51.

The inner second electrode 562 faces the inner first electrode 561 and has the same configuration as the inner first electrode 561. The inner second electrode 562 and the inner first electrode 561 form the first electrostatic actuator 56.

The outer second electrode 572 faces the outer first electrode 571 and has the same configuration as the outer first electrode 571. The outer second electrode 572 and the outer first electrode 571 form the second electrostatic actuator 57.

Moreover, these inner and outer second electrodes 562 and 572 are conducted by four conductive lines 58 which extend in a radial form along the diagonal line of the second substrate 52 from a part of the outer circumference of the inner second electrode 562 in the plan view of the etalon shown in FIG. 5.

From a part of the outer circumference of the outer second electrode 572, two second electrode lines 572L conductive to the conductive lines 58 are formed so as to extend toward the bottom left corner and the top right corner along the diagonal line of the second substrate 52 in the plan view of the etalon shown in FIG. 5. A second electrode pad 572P is formed at the distal end of each of the two second electrode lines 572L.

Among the two second electrode pads 572P, a second electrode pad 572P formed at the bottom left corner of the second substrate 52 is conductive to the first conductive electrode pad 581P of the first substrate 51.

Moreover, two second facing electrode pads 592P which are not conductive to the respective first electrodes 561 and 571 and the respective second electrodes 562 and 572 are formed at the top left and bottom right corners among the four corners of the second substrate 52 in the plan view shown in FIG. 5. The above-described two second electrode pads 572P are formed at the bottom left and the top right corners of the second substrate 52.

The second facing electrode pads 592P have the same configuration as the second electrode pads 572P. Thus, by forming three second facing electrode pads 592P and one second electrode pad 572P at the four corners of the second substrate 52, deformation of the second substrate 52 due to film stress occurring when forming the respective second electrodes 562 and 572 can be better prevented than when the respective electrode pads 572P and 592P are not formed at the four corners. Thus, it is possible to prevent the movable surface 522A (see FIG. 6) from being tilted. Therefore, the movable surface 522A and the mirror fixing surface 512A can be made to be parallel to each other, and the respective mirrors 54 and 55 can be made to be parallel to each other.

Since the second electrode pads 572P are conductive to the first conductive electrode pad 581P, a voltage applied to the second conductive electrode pad 582P based on the control signal input from the control device 6 is applied through the first conductive electrode pad 581P.

Here, on the surface of the second substrate 52 facing the first substrate 51, a region of the surface facing the bonding surface 513 of the first substrate 51 is a bonding surface 524 of the second substrate 52. A bonding layer 53 formed of polyorganosiloxane as its main material is formed on the bonding surface 524 similarly to the bonding surface 513 of the first substrate 51.

5. Configuration of Control Device

The control device 6 controls an overall operation of the colorimetric device 1. As the control device 6, a general-purpose personal computer, a mobile information terminal, and a colorimetric dedicated computer can be used, for example.

As shown in FIG. 1, the control device 6 includes a light source control unit 61, a colorimetric sensor control unit 62, a colorimetric processing unit 63 (analysis processing unit), and the like.

The light source control unit 61 is connected to the light source unit 211 of the light source device 2. Moreover, the light source control unit 61 outputs a prescribed control signal to the light source device 2 based on a user setting input, for example, and emits white light of prescribed brightness from the light source device 2.

The colorimetric sensor control unit 62 is connected to the colorimetric sensor 4. Moreover, the colorimetric sensor control unit 62 sets the wavelength of light to be received by the colorimetric sensor 4 based on the user setting input, for example, and outputs a control signal to the colorimetric sensor 4 so as to detect the amount of the received light of the wavelength. In this way, the colorimetric sensor 4 sets a voltage to be applied to the respective electrostatic actuators 56 and 57 based on the control signal so that light of the wavelength desired by the user can pass therethrough.

The colorimetric processing unit 63 controls the colorimetric sensor control unit 62 to change the inter-mirror gap of the etalon 5 to thereby change the wavelength of light passing through the etalon 5. Moreover, the colorimetric processing unit 63 acquires the amount of light having passed through the etalon 5 based on the reception light signal input from the light receiving element 42. Moreover, the colorimetric processing unit 63 calculates the chromaticity of the light reflected by the test subject A based on the amount of the light of the respective wavelengths obtained in this way.

6. Operation and Effect of First Embodiment

According to the first embodiment described above, the following effects are obtained.

According to the present embodiment, the etalon 5 includes the light interference area Ar1 facing the first and second substrates 51 and 52 and the protruding area Ar2 protruding from the light interference area Ar1. Moreover, the holding member 43 holds the distal end side (a side opposite to the light interference area Ar1) of the protruding area Ar2 to thereby hold the etalon 5. Thus, since the etalon 5 is held by the holding member 43 at a position away from the light interference area Ar1 where the respective mirrors 54 and 55 are formed, no stress will be applied to the light interference area Ar1 due to the holding force of the holding member 43. Therefore, it is possible to prevent deformation of the substrates 51 and 52 and deformation of the mirrors 54 and 55.

Moreover, even when heat is transmitted from the light source device 2 to the holding member 43, since the protruding area Ar2 is provided, heat is not likely to be transmitted to the light interference area Ar1. Therefore, it is possible to suppress deformation of the mirrors 54 and 55 and the substrates 51 and 52 due to heat.

Accordingly, it is possible to suppress a decrease in resolution of the etalon 5 due to the deformation of the mirrors 54 and 55 and to thus measure accurate light intensity.

Moreover, the protruding area Ar2 according to the invention is formed on the first substrate 51. Thus, it is possible to decrease the number of components as compared to a configuration in which a separate substrate having the protruding area Ar2 is provided. Therefore, it is possible to simplify the configuration.

Second Embodiment

Next, an etalon 5A of a colorimetric device according to a second embodiment of the invention will be described with reference to the drawings.

Figure 7:
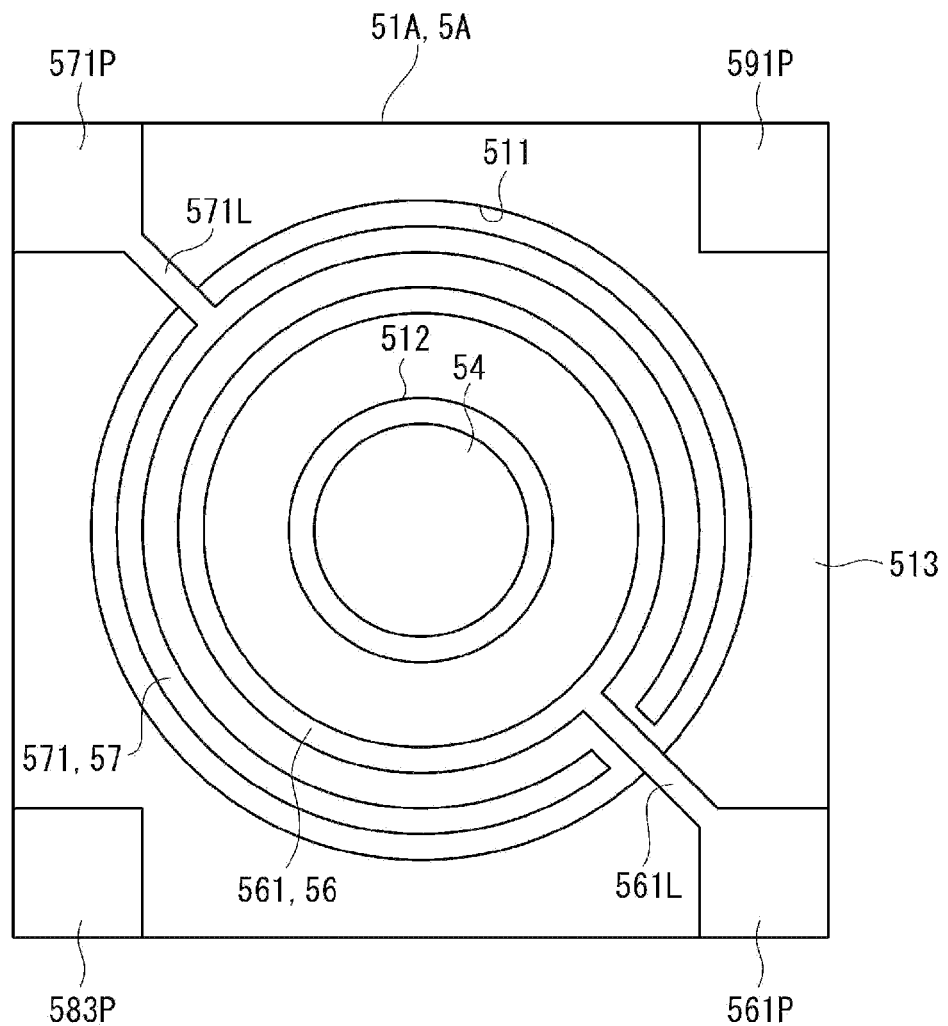
FIG. 7 is a plan view of a first substrate of an etalon according to a second embodiment of the invention.
Figure 8:
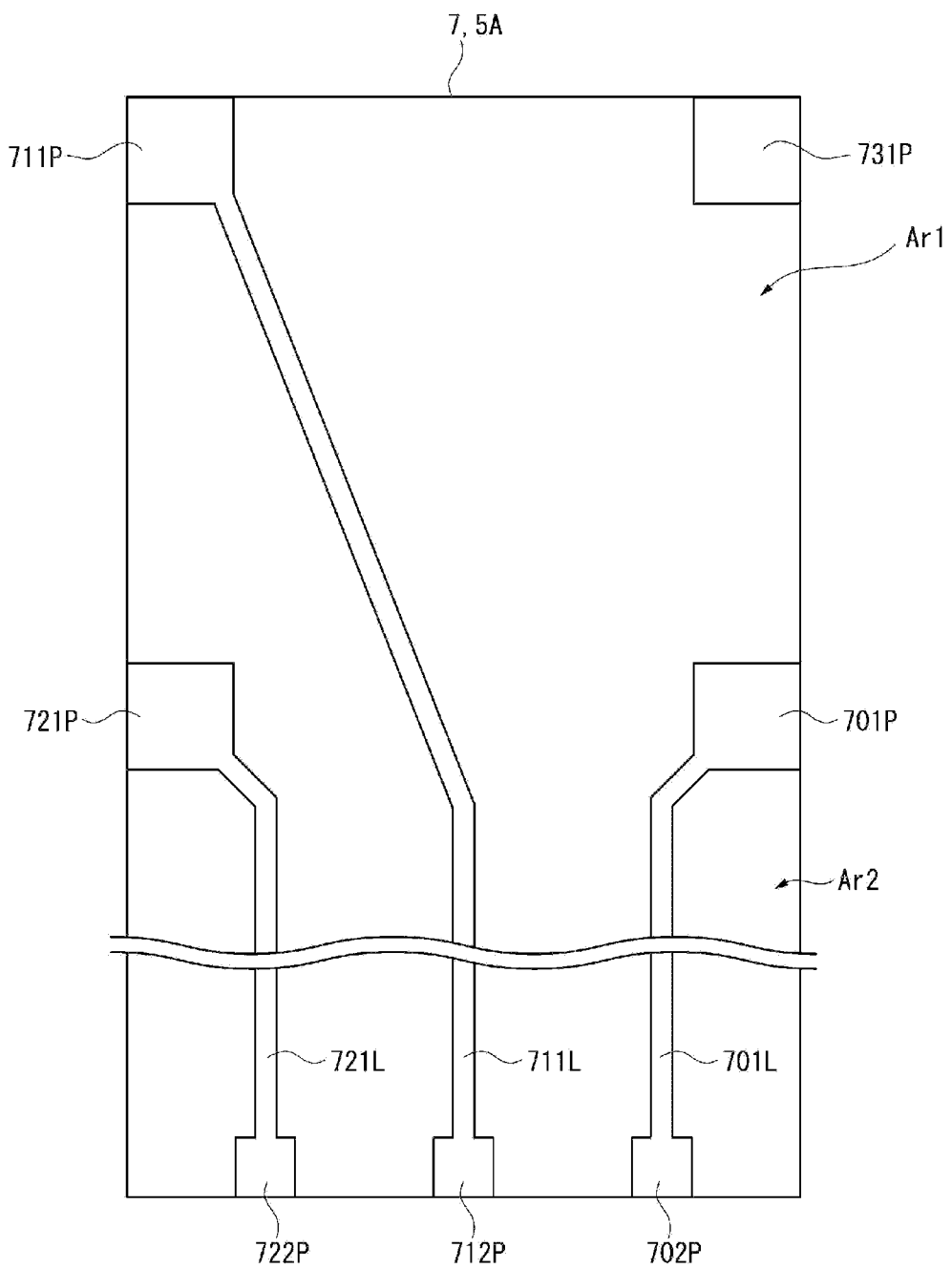
FIG. 8 is a plan view of an interposer of the etalon according to the second embodiment.

FIG. 7 is a plan view of a first substrate 51A of the etalon 5A according to the second embodiment, and FIG. 8 is a plan view of an interposer 7 of the etalon 5A. In addition, since the second substrate 52 of the etalon 5A of the present embodiment has the same configuration as the first embodiment, the second substrate 52 will not be illustrated, and instead, will be described by appropriately referring to FIG. 5.

The etalon 5 of the first embodiment described above has a two-layer configuration which includes the rectangular parallelepiped first substrate 51 and the square second substrate 52, and in which the protruding area Ar2 is formed on the first substrate 51. In contrast, the etalon 5A of the second embodiment is different in that it has a three-layer configuration which includes square first and second substrates 51A and 52 and a rectangular interposer 7 (supporting substrate).

In the following description, the same constituent elements as the first embodiment will be denoted by the same reference numerals, and the description thereof will not be provided.

The etalon 5A has a laminated structure in which the interposer 7, the first substrate 51A, and the second substrate 52 are stacked in that order from the lower side.

As shown in FIG. 7, the first substrate 51A is a square plate-shaped optical member in plan view and has dimensions such that one side thereof is 10 mm long, for example, and has the same shape as the second substrate 52.

One inner first electrode line 561L is formed so as to extend from a part of the outer circumference of the inner first electrode 561 toward the bottom right corner along the diagonal line of the first substrate 51A in the plan view shown in FIG. 7. An inner first electrode pad 561P is formed at the distal end of the inner first electrode line 561L.

Moreover, one outer first electrode line 571L is formed so as to extend from a part of the outer circumference of the outer first electrode 571 toward the top left corner along the diagonal line of the first substrate 51A in the plan view shown in FIG. 7. An outer first electrode pad 571P is formed at the distal end of the outer first electrode line 571L.

In the plan view shown in FIG. 7, among the four corners of the first substrate 51A, a first facing electrode pad 591P which is not conductive to the respective first electrodes 561 and 571 and the respective second electrodes 562 and 572 (see FIG. 5) is formed at the top right corner. Moreover, a conductive electrode pad 583P which is conductive to the second electrode pad 572P (see FIG. 5) of the second substrate 52 and a first conductive electrode pad 721P of the interposer 7 (described later) is formed at the bottom left corner. Furthermore, the above-described two first electrode pads 561P and 571P are formed at the top left and bottom right corners of the first substrate 51A.

As shown in FIG. 8, the interposer 7 is formed in the same rectangular shape in plan view as the first substrate 51 of the first embodiment and is formed of the same material as the first and second substrates 51A and 52. The interposer 7 includes a light interference area Ar1 facing the second substrate 52 and a protruding area Ar2 protruding in the longitudinal direction of the light interference area Ar1. Moreover, the light interference area Ar1 of the interposer 7 is bonded to a surface opposite to the bonding surface 513 of the first substrate 51.

Moreover, in the plan view shown in FIG. 8, among the four corners of the light interference area Ar1, a first inner conductive electrode pad 701P which is conductive to the inner first electrode pad 561P is formed at the bottom right corner. Moreover, a first outer conductive electrode pad 711P which is conductive to the outer first electrode pad 571P is formed at the top left corner. Furthermore, a first conductive electrode pad 721P which is conductive to the conductive electrode pad 583P and the second electrode pad 572P (see FIG. 5) is formed at the bottom left corner.

Here, a method of conducting the electrode pads 583P, 561P, and 571P of the first substrate 51A to the electrode pads 721P, 701P, and 711P of the interposer 7 is not particularly limited, and they may be connected by an arbitrary connection method.

For example, a concave conductive paste injection portion may be formed on the surface of the first substrate 51A facing the interposer 7 at positions overlapping the electrode pads 583P, 561P, and 571P in plan view. Then, the electrode pads 583P and 721P (the electrode pads 561P and 701P and the electrode pads 571P and 711P) which overlap each other in plan view may be connected by a conductive paste such as an Ag paste.

Alternatively, wirings pulled out from the electrode pads 583P, 561P, and 571P may be extended to the surface of the first substrate 51A facing the interposer 7, and these extended wirings may be conductive to the electrode pads of the interposer 7.

One inner conductive electrode line 701L is formed so as to extend from the first inner conductive electrode pad 701P toward the protruding area Ar2 up to one end of the interposer 7 in the plan view shown in FIG. 8. A second inner conductive electrode pad 702P is formed at the distal end of the inner conductive electrode line 701L.

One outer conductive electrode line 711L is formed so as to extend from the first outer conductive electrode pad 711P toward the protruding area Ar2 up to one end of the interposer 7 in the plan view shown in FIG. 8. A second outer conductive electrode pad 712P is formed at the distal end of the outer conductive electrode line 711L.

One conductive electrode line 721L is formed so as to extend from the first conductive electrode pad 721P toward the protruding area Ar2 up to one end of the interposer 7 in the plan view shown in FIG. 8. A second conductive electrode pad 722P is formed at the distal end of the conductive electrode line 721L.

The second inner conductive electrode pad 702P, the second outer conductive electrode pad 712P, and the second conductive electrode pad 722P are connected to the printed substrate 41 through the FPC 44 (see FIG. 1). In this way, a voltage based on the control signal input from the control device 6 (see FIG. 1) is applied to the respective electrode pads 702P, 712P, and 722P.

According to the second embodiment described above, the following effects are obtained in addition to the same effects as the first embodiment.

That is, the etalon 5A of the second embodiment includes the interposer 7 in addition to the first and second substrates 51A and 52, and the protruding area Ar2 is formed on the interposer 7. Thus, since the interposer 7 is further provided, it is possible to suppress transmit of heat even more than the first embodiment. Therefore, it is possible to reliably suppress deformation of mirrors due to heat.

Moreover, a material having a small heat transmission coefficient can be used as the interposer 7. With such a configuration, transmission of heat can be suppressed further more.

Third Embodiment

Figure 9:
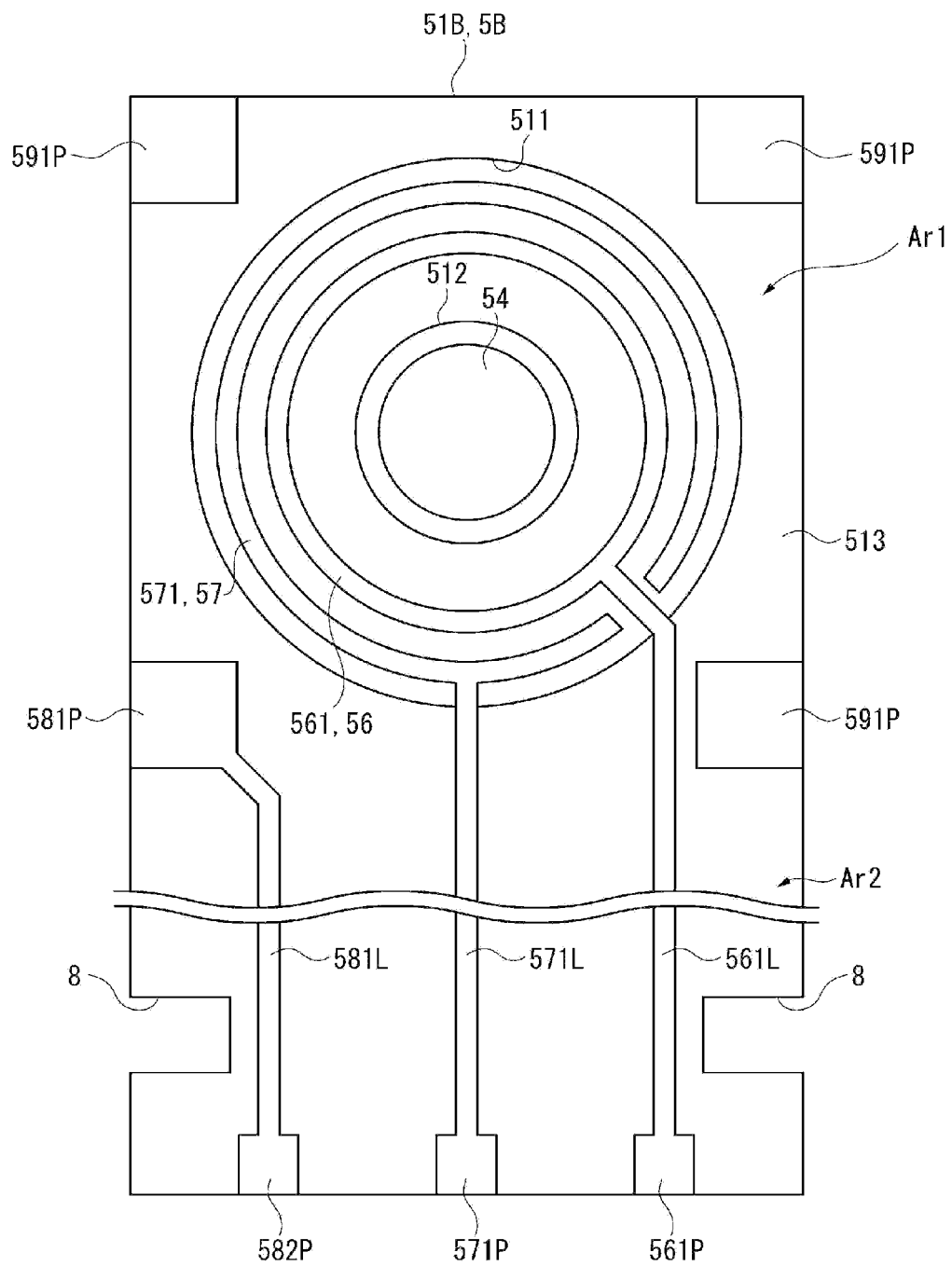
FIG. 9 is a plan view of a first substrate of an etalon according to a third embodiment of the invention.

FIG. 9 is a plan view showing a first substrate 51B of an etalon 5B according to a third embodiment.

The etalon 5B of the third embodiment has substantially the same configuration as the first substrate 51 of the etalon 5 according to the first embodiment but is different in that a pair of cutout portions 8 (vibration absorbing portions) is formed in the protruding area Ar2 of the first substrate 51B.

In the following description, the same constituent elements as the first embodiment described above will be denoted by the same reference numerals, and the description thereof will not be provided.

The cutout portions 8 suppress vibration from being transmitted from the outside to the light interference area Ar1. The cutout portions 8 are formed in the protruding area Ar2 of the first substrate 51B by notching the side edges extending in the protruding direction of the protruding area Ar2 of the first substrate 51B in a concave U-shape in the plan view shown in FIG. 9. That is, the protruding area Ar2 has a smaller width dimension than the first substrate 51B at positions where the cutout portions 8 are formed.

According to the third embodiment described above, the following effects are obtained in addition to the same effects as the first embodiment.

According to the present embodiment, a pair of cutout portions 8 is formed in the protruding area Ar2 of the first substrate 51B. In such a structure, the small-width portion where the cutout portions 8 are formed is structurally weak. Thus, when vibration is applied from the outside, a force which confines the vibration acts on the light interference area Ar1, the structurally weak portion where the cutout portions 8 are formed is deformed to thereby absorb the vibration. In this way, it is possible to suppress vibration of the light interference area Ar1.

First Modified Example of Third Embodiment

Figure 10:
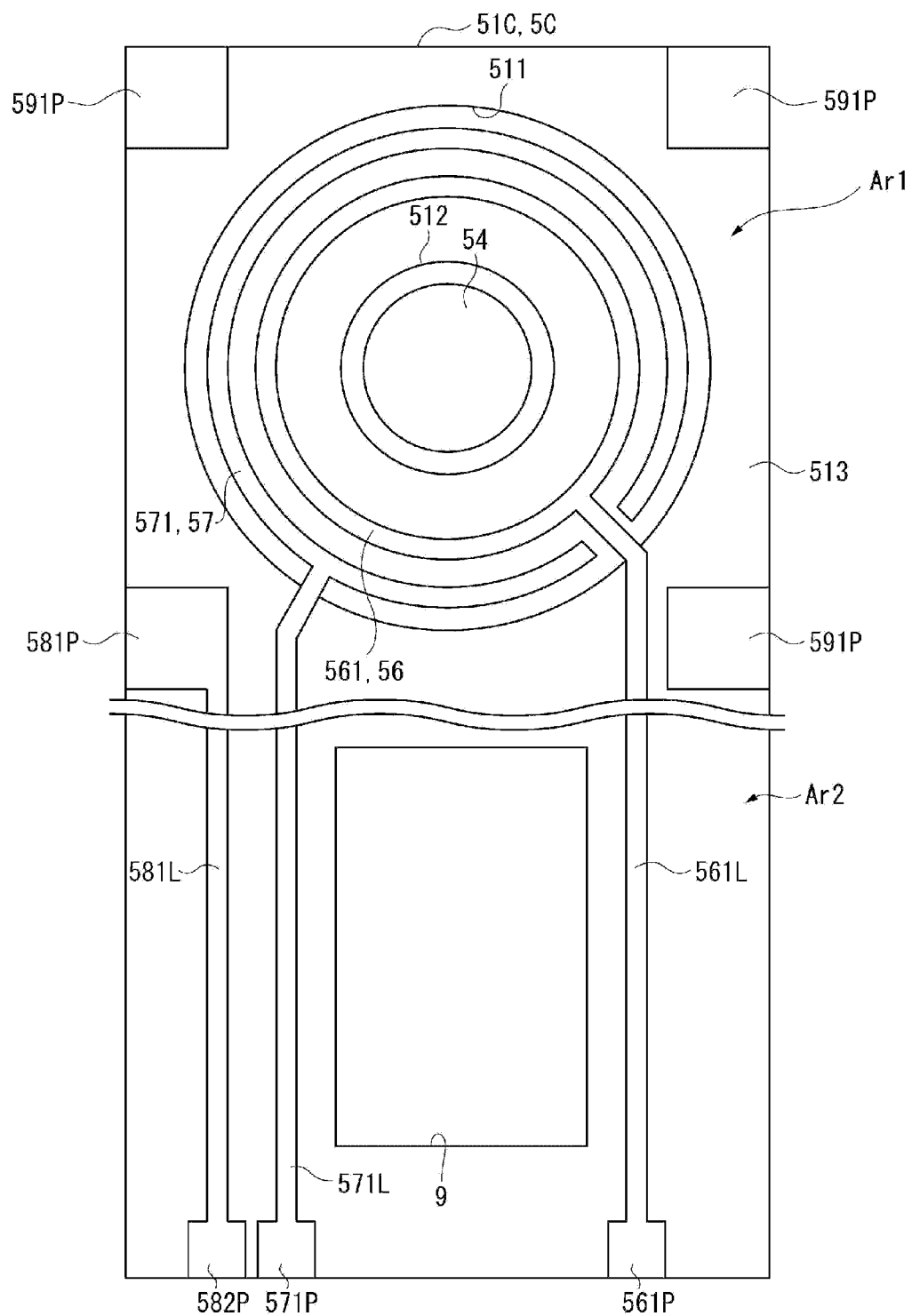
FIG. 10 is a plan view of a first substrate of an etalon according to a first modified example of the third embodiment.

FIG. 10 is a plan view showing a first substrate 51C of an etalon 5C according to a first modified example of the third embodiment.

The etalon 5C of the first modified example has substantially the same configuration as the first substrate 51 of the etalon 5 according to the first embodiment described above but is different in that a rectangular through hole 9 (vibration absorbing portion) is formed in the protruding area Ar2 of the first substrate 51C.

According to the present modified example, a portion of the protruding area Ar2 of the first substrate 51C where the through hole 9 is formed is structurally weak. When vibration is applied from the outside, the vibration is absorbed by the portion where the through hole 9 is formed. Thus, it is possible to prevent vibration from being transmitted to the light interference area Ar1 of the etalon 5C.

Second Modified Example of Third Embodiment

Figure 11:
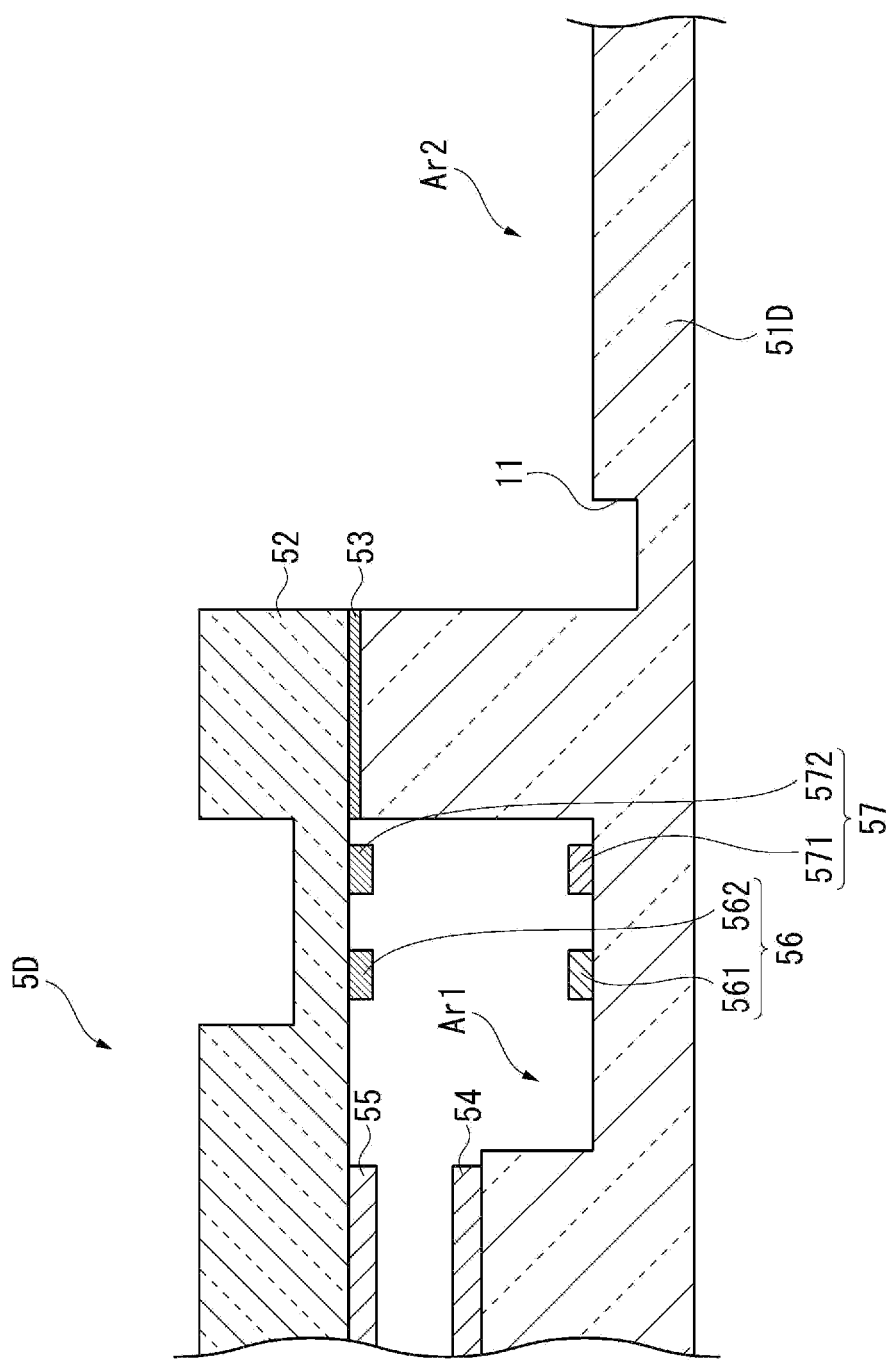
FIG. 11 is a partial cross-sectional view of an etalon according to a second modified example of the third embodiment.

FIG. 11 is a partially cross-sectional view of an etalon 5D according to a second modified example of the third embodiment.

The etalon 5D of the second modified example has substantially the same configuration as the etalon 5 of the first embodiment, but a groove portion 11 (vibration absorbing portion) is formed in the protruding area Ar2 of a first substrate 51D. The groove portion 11 is formed at one end (the light interference area Ar1 side) of the protruding area Ar2 along the width direction of the first substrate 51D.

According to the present modified example, a portion of the protruding area Ar2 of the first substrate 51D where the groove portion 11 is formed is structurally weak. Thus, when vibration is applied from the outside, the vibration can be absorbed by the groove portion 11. Therefore, it is possible to suppress vibration from being transmitted to the light interference area Ar1 of the etalon 5D.

Modification of Embodiment

The invention is not limited to the embodiments described above, but the invention includes modifications, improvements, and the like within a range where the object of the invention can be accomplished.

Figure 12A:
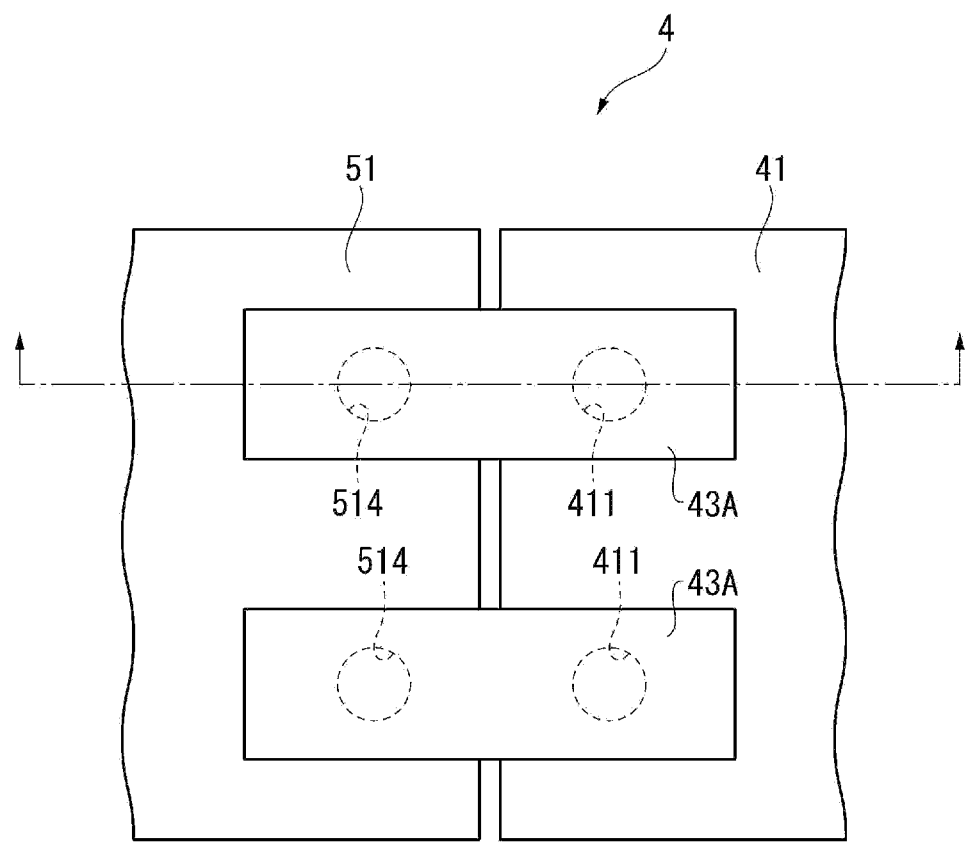
FIGS. 12A and 12B are a plan view and a cross-sectional view showing a main part of a colorimetric sensor according to a modified example of the invention.
Figure 12B:
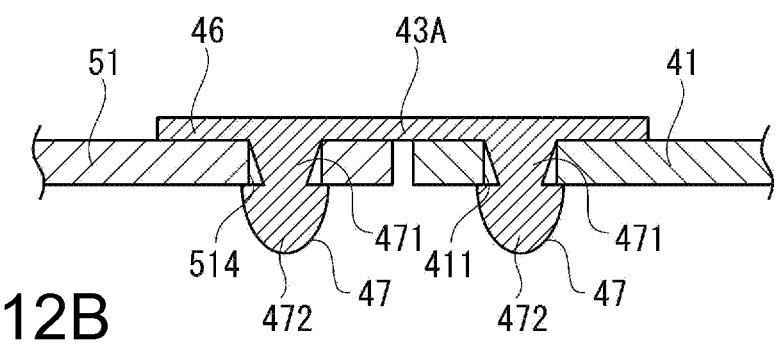
Figure 13:
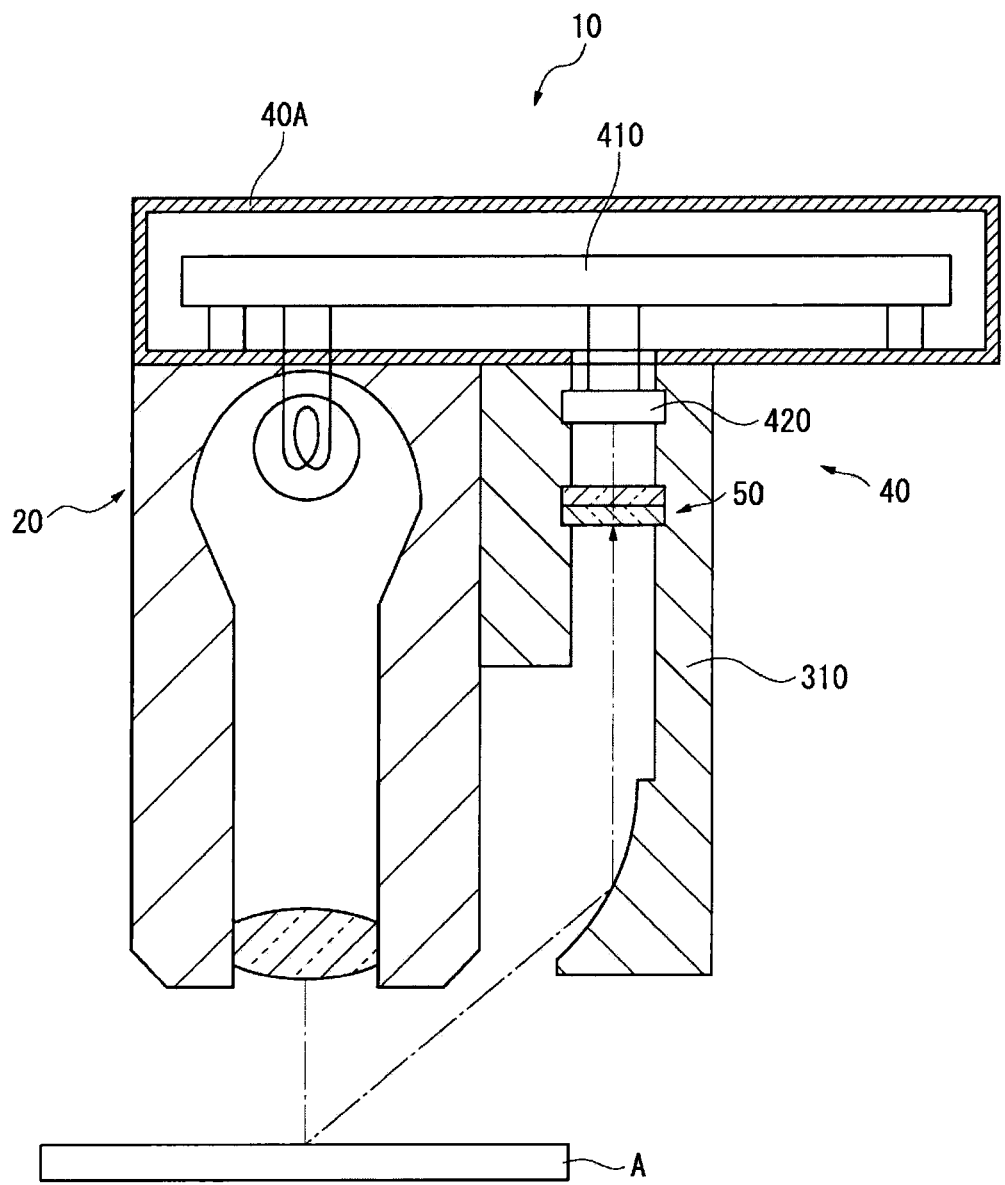
FIG. 13 is a schematic view showing a simplified configuration of a colorimetric device according to the related art.

FIGS. 12A and 12B are an enlarged plan view and an enlarged cross-sectional view showing a main part of the colorimetric sensor 4 according to the modified example of the invention.

In the colorimetric sensor 4 of the present modified example, the first substrate 51 and the printed substrate 41 are connected by a pair of holding members 43A.

A pair of insertion holes 514 is formed on the distal end side of the protruding area Ar2 of the first substrate 51, and a pair of insertion holes 411 is formed on one end side of the printed substrate 41.

The holding member 43A is formed of a material such as a resin or plastics having elastic properties and includes a plate-shaped holding member body 46 and a pair of protruding portions 47 protruding from the holding member body 46, which are integrated with each other.

The protruding portion 47 includes a truncated conical portion 471 at its base end side (the holding member body 46 side) and a hemispheric portion 472 at its distal end. The outer diameter dimension of the hemispheric portion 472 is larger than the diameter dimension of the respective insertion holes 411 and 514.

Moreover, the protruding portions 47 of the holding member 43A are inserted into the insertion holes 514 of the first substrate 51 and the insertion holes 411 of the printed substrate 41, whereby the pair of holding members 43A hold the first substrate 51 and the printed substrate 41. Specifically, when the hemispheric portions 472 of the protruding portions 47 are pushed into the respective insertion holes 411 and 514, they are contracted and inserted into the respective insertion holes 411 and 514. Since the hemispheric portions 472 are expanded to restore their original size after being inserted into the respective insertion holes 411 and 514, the respective protruding portions 47 are fixed to the respective insertion holes 411 and 514. In this way, the holding members 43A hold the first substrate 51 and the printed substrate 41.

In addition, a notch may be formed in the protruding portions 47 so that the protruding portions 47 are easily contracted when they are inserted into the insertion holes 411 and 514.

In the respective embodiments described above, although an etalon which is a variable wavelength interference filter is illustrated as an example of the interference filter according to the invention, an interference filter which does not change the size of the inter-mirror gap G may be used.

In the respective embodiments described above, although the second substrate 52 has a square shape, the second substrate 52 may be formed in a rectangular shape including the light interference area Ar1 and the protruding area Ar2, and the first substrate 51 may be formed in a square shape.

The etalon 5A in the second embodiment, although the interposer 7, the first substrate 51A, and the second substrate 52 are stacked in that order, the etalon 5A may be configured by stacking the first substrate 51A, the second substrate 52, and the interposer 7 in that order.

In the respective embodiments described above, although the electrostatic actuators 56 and 57 are illustrated as a means for changing the inter-mirror gap G, an electromagnetic actuator which includes an electromagnetic coil passing current therethrough and a permanent magnet movable in relation to the electromagnetic coil by electromagnetic force may be used. According to such a configuration, when current flows through the electromagnetic coil, an electromagnetic force is generated by interaction between a magnetic flux from the permanent magnet and the current. The electromagnetic force causes the permanent magnet to move toward the electromagnetic coil, whereby a displacement portion is displaced. Alternatively, a piezoelectric element which can contract and expand in response to an applied voltage may be provided between substrates.

In the first embodiment, although the protruding area Ar2 is formed on the first substrate 51, for example, the protruding area Ar2 may be formed on the second substrate 52. Alternatively, the protruding area Ar2 may be formed on both the first and second substrates 51 and 52.

In the embodiments described above, although the bonding surfaces 513 and 524 are bonded by the bonding layer 53, the invention is not limited to this. For example, the bonding layer 53 may not be formed, and a so-called room temperature activation surface activated method in which the bonding surfaces 513 and 524 are activated, and the activated bonding surfaces 513 and 524 are bonded together by being superimposed on each other and pressed. Moreover, an optional bonding method may be used.

In the embodiments described above, although the colorimetric sensor 4 is illustrated as an example of the optical module of the invention, and the colorimetric device 1 including the colorimetric sensor 4 is illustrated as an example of the spectroscopic analyzer of the invention, the invention is not limited to this. For example, a gas sensor that supplies gas into a sensor and detects light absorbed by the gas among the incident lights may be used as the optical module according to the invention, and a gas detection device that analyzes and identifies the gas supplied into the sensor using such a gas sensor may be used as the spectroscopic analyzer according to the invention. In addition, the spectroscopic analyzer may be a spectroscopic camera, a spectroscopic analyzer, and the like including such an optical module.

Moreover, the intensity of light of respective wavelengths may be changed over time, and data may be transmitted by the light of the respective wavelength. In this case, light of a specific wavelength is dispersed by the etalon 5 included in the optical module, and is received by the light receiving unit, whereby data transmitted by the light of the specific wavelength can be extracted. Moreover, optical transmission can be performed by processing data carried on the light of the respective wavelengths using a spectroscopic analyzer including such a data extraction optical module.

The entire disclosure of Japanese Patent Application No. 2011-015698, filed Jan. 27, 2011, is expressly incorporated by reference herein.

What is claimed is:

1. An optical module comprising:
an interference filter including a first substrate, a second substrate facing the first substrate, a first reflecting film formed on a surface of the first substrate facing the second substrate, and a second reflecting film formed on the second substrate so as to face the first reflecting film with a prescribed gap therebetween; and
a holding member that holds the interference filter,
wherein the interference filter includes a light interference area in which the first and second reflecting films are formed as seen in a thickness direction of the substrates, and a protruding area protruding in a direction orthogonal to the thickness direction of the substrate away from the light interference area,
wherein the holding member holds the interference filter at one end side of the protruding area opposite to the light interference area; and
wherein an area of the first substrate is larger than an area of the second substrate to define the protruding area.

2. The optical module according to claim 1,
wherein a vibration absorbing portion is formed in the protruding area.

3. A spectroscopic analyzer including the optical module according to claim 1,
wherein the optical module includes a light receiving unit that receives a test subject light extracted by the interference filter, and
wherein the spectroscopic analyzer further includes an analysis processing unit that analyzes optical properties of the test subject light based on the intensity of the test subject light received by the light receiving unit.

4. The optical module of claim 1, wherein a center of the interference filter is located on the protruding area.

5. The optical module of claim 1, wherein another end side of the interference filter opposite the one end side is not supported by the holding member.

6. An optical module comprising:
an interference filter including a first mirror and a second mirror facing the first mirror with a gap therebetween, the first mirror being formed on a first substrate and the second mirror being formed on a second substrate; and
a holding member holding the interference filter,
wherein the interference filter includes a light interference area in which the first and second mirrors are formed as seen in a thickness direction of the first mirror, and a protruding area protruding in a direction orthogonal to the thickness direction away from the light interference area,
wherein the holding member holds the interference filter at one end side of the protruding area opposite to the light interference area; and
wherein an area of the first substrate is larger than an area of the second substrate to define the protruding area.

7. The optical module of claim 6, wherein a center of the interference filter is located on the protruding area.

8. The optical module of claim 6, wherein another end side of the interference filter opposite the one end side is not supported by the holding member.

* * * * *